(12) United States Patent
Pearce et al.

(10) Patent No.: US 8,582,741 B2
(45) Date of Patent: Nov. 12, 2013

(54) UNIFICATION OF ROSTERS IN A COMMUNICATION SYSTEM

(75) Inventors: Chris Pearce, Dallas, TX (US); Ho Bao, Richardson, TX (US); Ping Ni, Arlington, TX (US)

(73) Assignee: Cisco Technology, Inc., San Jose, CA (US)

( * ) Notice: Subject to any disclaimer, the term of this patent is extended or adjusted under 35 U.S.C. 154(b) by 402 days.

(21) Appl. No.: 12/965,176

(22) Filed: Dec. 10, 2010

(65) Prior Publication Data
US 2012/0147128 A1 Jun. 14, 2012

(51) Int. Cl.
*H04M 3/42* (2006.01)

(52) U.S. Cl.
USPC ............ 379/201.12; 379/201.01; 379/201.02; 455/418; 707/610; 707/694; 709/201

(58) Field of Classification Search
USPC ............ 348/14.01–14.16; 370/259–271, 370/351–357; 379/201.01, 202.01–207.01; 709/201–207, 217–248; 455/403–426.2, 456.1–466, 455/550.1–560, 575.1–575.9, 90.1–90.3
See application file for complete search history.

(56) References Cited

U.S. PATENT DOCUMENTS

| 7,050,425 | B2 | 5/2006 | Richter et al. | |
| 7,136,398 | B1 | 11/2006 | Huart et al. | |
| 7,519,708 | B2 * | 4/2009 | Malik | 709/225 |
| 2002/0143877 | A1 * | 10/2002 | Hackbarth et al. | 709/205 |
| 2006/0176831 | A1 * | 8/2006 | Greenberg et al. | 370/260 |
| 2006/0235981 | A1 | 10/2006 | Westman | |
| 2007/0260684 | A1 * | 11/2007 | Sharma et al. | 709/204 |
| 2009/0204671 | A1 | 8/2009 | Hawkins | |
| 2009/0319913 | A1 * | 12/2009 | Serr et al. | 715/753 |

FOREIGN PATENT DOCUMENTS

WO    WO2010/036260 A1    4/2010

OTHER PUBLICATIONS

International Search Report and Written Opinion in PCT Application No. PCT/US2011/063002 dated Mar. 13, 2012.

* cited by examiner

*Primary Examiner* — Hemant Patel
(74) *Attorney, Agent, or Firm* — Brinks Gilson & Lione

(57) ABSTRACT

In one embodiment, a method for unifying rosters is provided. A client receives an escalation request associated with a first roster and responds to the escalation request. The client subscribes to the first roster as a participant in response to accepting the escalation request or subscribes to the first roster as an observer in response to denying the escalation request. The client identifies a second roster within the first roster that the client is not subscribed to and subscribes to the first roster as an observer. The client updates an entry associated with the client in the second roster to indicate that the client is subscribed to the first roster as one of a participant or an observer. The client additionally updates an entry associated with the client in the first roster to indicate that the client is subscribed to the second roster as an observer.

22 Claims, 3 Drawing Sheets

UNIFICATION OF ROSTERS IN A COMMUNICATION SYSTEM

BACKGROUND

The present embodiments relate to unification of rosters in a communication system.

Communication systems may provide data structures known as rosters that identify users participating in a type of communication, such as the identities of users participating in a video conference call or the identities of users participating in an instant messaging session. When multiple types of communication are available that relate to the same communication event, it is often difficult for users participating in the different communication types to know all the users participating in all the communication types relating to the same communication event or to know all the different communication types that are available relating to the same communication event.

For example, a video conferencing session and an instant messaging session may be available that relate to the same communication event. A user may choose to participate in the video conferencing session, but the user may choose not to participate in the instant messaging session, the user's device may not be capable of participating in the instant messaging session, or the user may not be aware of the instant messaging session. Because the user is participating in the video conferencing session, the user may determine the users participating in the video conferencing session based on the video conference roster. However, since the user is not participating in the instant messaging session, the user does not have access to the instant messaging roster and may not be able to determine the users participating in the instant messaging service. Accordingly, the user may not be able to determine all the users participating in communications relating to the communication event.

DESCRIPTION OF EXAMPLE EMBODIMENTS

Figure 1:
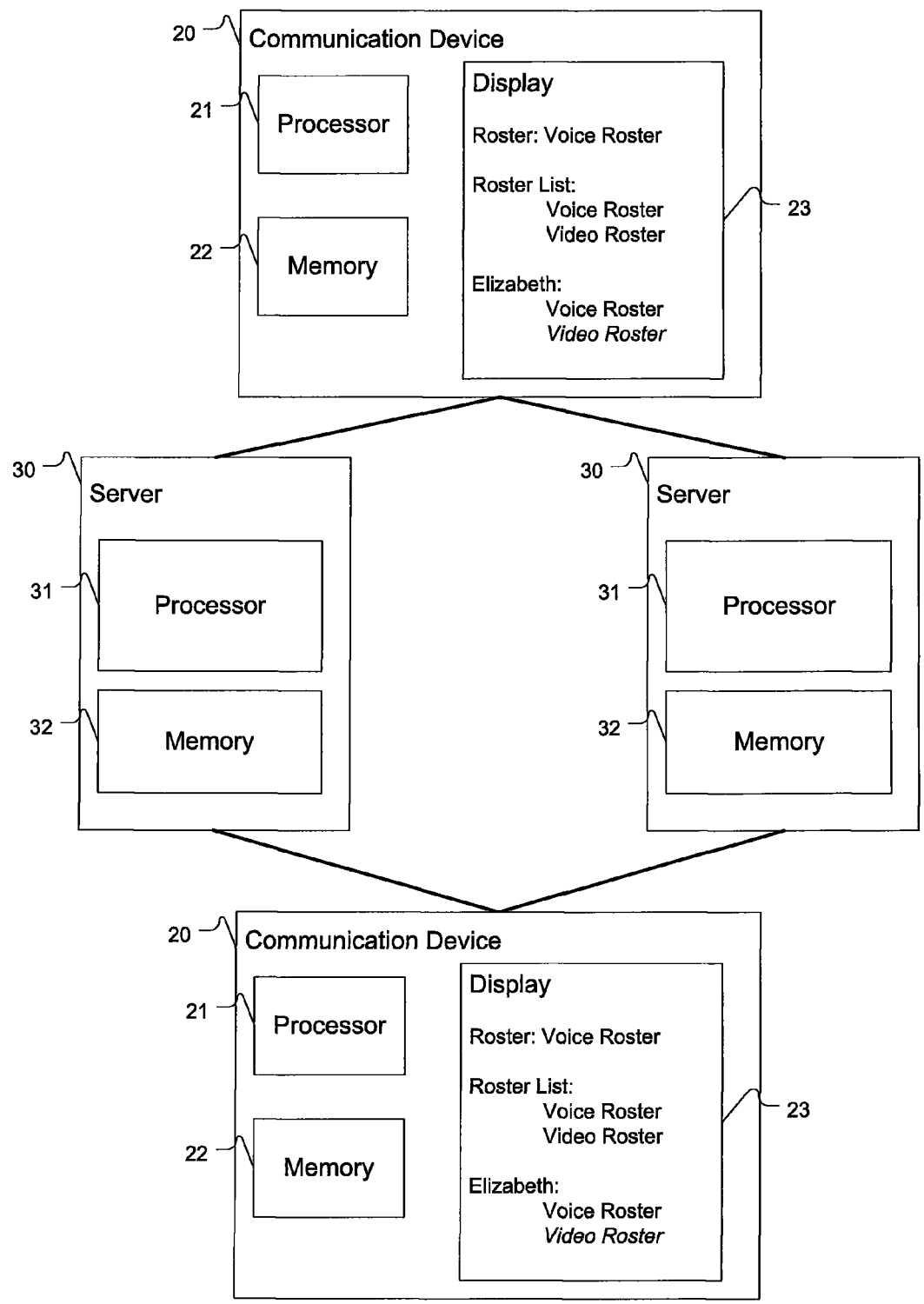
FIG. 1 illustrates one embodiment of a communication system.

The present embodiments relate to systems and methods for unifying rosters in a communication system. Generally, a communication system allows a client to subscribe as a participant to a roster associated with a media type when the client desires to actively participate in that media type and allows a client to subscribe as an observer to a roster associated with a media type when the client does not desire to actively participate in that media type. Often, the client subscribes to a roster in response to an escalation request that is initiated by an escalator. When the escalator initiates the escalation event, the escalator provides a list of rosters to a roistering service, for example, that the escalator is currently subscribed to, both as a participant and an observer.

When a client subscribes to a roster, the client searches the roster for any roster that the client is not currently subscribed to. If a roster is identified that the client is not currently subscribed to, the client subscribes to that roster as an observer and updates an entry in the identified roster associated with the client to indicate all other rosters that the client is subscribed to and whether the client is subscribed to each roster as a participant or an observer. Additionally, the client updates an entry in all other rosters that the client is subscribed to indicate that the client is now subscribed to the identified roster an observer. Due to this process, a client will have access to all rosters relating to a communication event so that the client may determine all the users participating in the communication event and all the media types that are available related to the communication event.

In one aspect, a method for unifying rosters in a communication system is provided. The method may include a client receiving an escalation request associated with a first roster. The client may respond to the escalation request, the response to the escalation request including one of an acceptance of the escalation request or a denial of the escalation request. The client may subscribe to the first roster as a participant in response to accepting the escalation request or the client may subscribe to the first roster as an observer in response to denying the escalation request.

The client may identify a second roster within the first roster that the client is not subscribed to and subscribe to the second roster as an observer. The client may update an entry associated with the client in the second roster to indicate that the client is subscribed to the first roster as one of a participant or an observer. The client may additionally update an entry associated with the client in the first roster to indicate that the client is subscribed to the second roster as an observer.

In a second aspect, software encoded in one or more computer-readable media is provided. When executed the software is operable to receive an escalation request associated with a first roster and respond to the escalation request, the response to the escalation request including one of an acceptance of the escalation request or a denial of the escalation request. The software is further operable to subscribe to the first roster as a participant in response to accepting the escalation request or to subscribe to the first roster as an observer in response to denying the escalation request.

The software is further operable to identify a second roster within the first roster that the client is not subscribed to and to subscribe to the second roster as an observer. The software is further operable to update an entry associated with the client in the second roster to indicate that the client is subscribed to the first roster as one of a participant or an observer, and to update an entry associated with the client in the first roster to indicate that the client is subscribed to the second roster as an observer.

In a third aspect, an apparatus comprising a memory and a processor is provided. The memory includes a set of instructions. The processor is in communication with the memory and is configured to execute the set of instructions stored in the memory. The set of instructs direct the processor to receive an escalation request associated with a first roster and to respond to the escalation request, the response to the escalation request including one of an acceptance of the escalation request or a denial of the escalation request. The set of instructions further direct the processor to subscribe to the first roster as a participant in response to accepting the escalation request or to subscribe to the first roster as an observer in response to denying the escalation request.

The set of instructions further direct the processor to identify a second roster within the first roster that the client is not subscribed to and to subscribe to the second roster as an observer. The set of instructions further direct the processor to update an entry associated with the client in the second roster to indicate that the client is subscribed to the first roster as one of a participant or an observer, and to update an entry associated with the client in the first roster to indicate that the client is subscribed to the second roster as an observer.

FIG. 1 shows a system 100 including communication devices 20 (also known as clients) and servers 30. The system 100 is a network, communication system, remote terminal system, or any other system for providing communication or service.

The servers 30 may include a processor 31 and memory 32, and may be a collaboration server, a server of a call agent/softswitch/VoIP PBX, an instant messaging server, email server, exchange server, information router, content router, RRS threaded discussion group or any now known or later developed device for providing communication service. The servers 30 provide communication service to the communication devices 20. Communication service may include phone service, video messaging service, video conferencing service, conferencing service, electronic mail service, instant message service, SMS, voice mail service, calendar service, any combination thereof, or any now known or later developed communication service.

The communication devices 20 and servers 30 may communicate with each other using a protocol, telephone line, wireless device, wire (cable), any combination thereof, or any other now known or later developed communication technique. The communication may be direct or indirect.

The communication device 20 includes a processor 21, memory 22, and display device 23. Additional, different, or fewer components may be provided. For example, the communication device 20 may include an input device, such as a keyboard, mouse, microphone, or joystick.

The communication device 20 is a workstation, personal computer, laptop computer, personal digital assistant (PDA), remote terminal device, telephone, cellular telephone, handheld device, portable device, camera, music player, or other now known or later developed communication device. The communication device 20 is a device for receiving, transmitting, and managing communication. The communication device 20 may be used for the transmission of signs, signals (including control signals), writing, images and sounds or intelligence of any nature.

The communication device 20 may be associated with a user (e.g., operator), such as being registered to the user, owned by the user, associated with user as rule, operating on the users behalf, and/or generally used by the user. Communication services for a user may be transmitted to associated communication devices 20. For example, a user may be registered for phone and email service. The phone and email service may be sent to some, none, or all of the communication devices 20 associated with the user.

The processors 21 and 31 are general processors, digital signal processors, application specific integrated circuits, field programmable gate arrays, analog circuits, digital circuits, combinations thereof, or other now known or later developed processors. The processors 21 and 31 may be single devices or combinations of devices, such as associated with a network or distributed processing. Any of various processing strategies may be used, such as multi-processing, multi-tasking, parallel processing, remote processing, centralized processing or the like. The processors 21 and 31 are responsive to instructions stored as part of software, hardware, integrated circuits, firmware, micro-code or the like.

Generally, a communication device 20 receives an escalation request from another communication device 20 or from a server 30 that has been initiated by an escalator. When the escalator initiates the escalation request, the escalator provides information to services, such as roistering services hosted on a server 30, regarding what rosters the escalator is subscribed to. The escalation request is associated with a roster and may include a request to add a new media type to a communication event and/or a request to add a new person to a communication event. In some implementations, the escalation request received at the communication device 20 may additionally include a listing of all the rosters that an escalator who initiates the escalation request is subscribed to.

The request to add a new media type may be a request to add a video conferencing session, a voice conferencing session, an instant messaging session, a collaboration/presentation share, or any other media types that a service associated with the servers 30 may offer. In some implementations, the servers 30 associated with the media type may store the roster and the roster may be associated with a unique identifier.

The communication device 20 responds to the escalation request by either accepting the escalation request or denying the escalation request. In some implementations, the response to the escalation request may additionally include a listing of all the rosters that the communication device 20 is subscribed to.

If the communication device 20 accepts the escalation request, the communication device 20 subscribes as a participant to the roster associated with the escalation request. By subscribing to the roster as a participant, the communication device 20 actively participates in the media type associated with the roster. The communication device 20 additionally gains access to the information within the roster identifying the users that are participating or observing the roster, and identifying what additional rosters that the users that are participating or observing the roster associated with the escalation request are also associated with.

Alternatively, if the communication device 20 denies the escalation request, the communication device 20 subscribes to the to the roster associated with the escalation request as an observer. By subscribing to the roster as an observer, the communication device 20 does not participate in the media type associated with the roster. However, the communication device 20 gains access to the information within the roster identifying the users that are participating or observing the roster, and identifying what additional rosters that the clients that are participating or observing the roster associated with the escalation request are also associated with.

The communication device 20 searches the roster associated with the escalation request for any rosters that the communication device 20 is not subscribed to. When the communication device 20 identifies a new roster, the communication device 20 subscribes to the new roster as an observer. As discussed above, by subscribing to the roster as an observer, the communication device 20 gains access to the information within the new roster identifying the users that are participating or observing the new roster, and identifying what additional rosters that the users that are participating or observing the new roster are also associated with.

As the communication device 20 subscribes to new rosters, the communication device 20 continues to search the new rosters for other rosters that the communication device 20 is not subscribed to. When the communication device 20 identifies a new roster, the communication device 20 subscribes to the new roster as an observer and updates an entry associated with the communication device 20 in the new roster to indicate what rosters the communication device 20 is subscribed to and whether the communication device 20 is subscribed to each roster as a participant or an observer. Additionally, the communication device 20 updates entries in rosters that the communication device 20 is already subscribed to indicate that the communication device 20 is now subscribed to the new roster and to indicate that the communication device 20 is subscribed to new roster as an observer.

As each communication device 20 participating in a communication event performs this process, unified rosters are created that contain an entry for each user participating in a communication event, and that contain a listing of the different rosters that each user participating in the communication event is subscribed to. As rosters are modified due to, for example, additional communication devices 20 subscribing to a roster, communication devices 20 leaving a communication event, and/or additional media types being added to or removed form the communication event, the changes to the roster are pushed out to the communication devices 20 subscribed to the roster so that the communication devices 20 have access to the updated roster.

Figure 2:
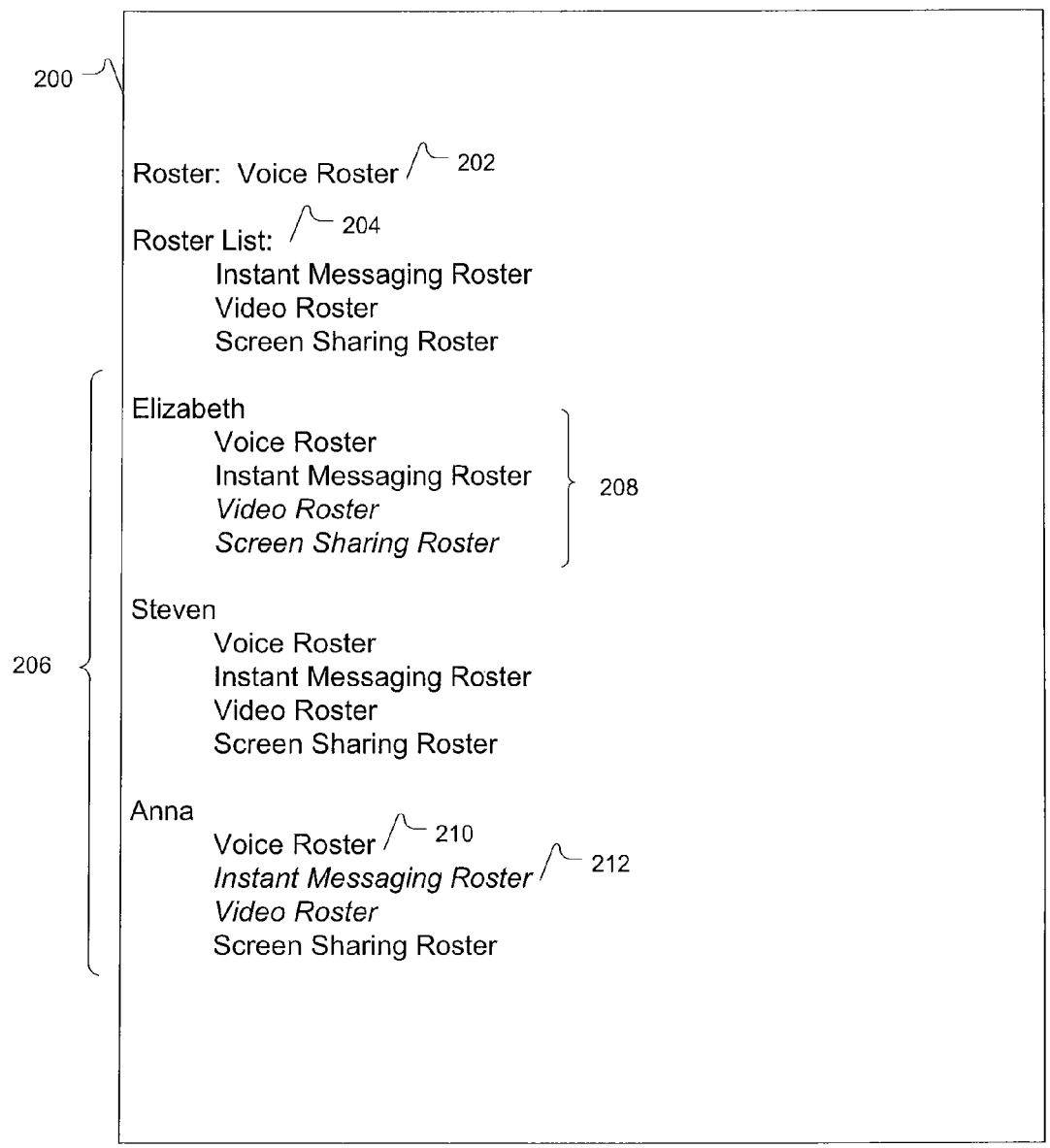
FIG. 2 illustrates one embodiment of a unified roster.

One implementation of a unified roster 200 is illustrated in FIG. 2. As shown in FIG. 2, the unified roster 200 may include a unique identifier 202 for the roster; a listing of other rosters that users subscribed to the roster are subscribed to 204; a listing of the users subscribed to the roster 206; and a listing of rosters that each user may be subscribed to 208. In some implementations, the roster may differentiate between rosters that a user is subscribed to as a participant and rosters that a user is subscribed to as an observer. For example, the roster may show a roster than a user is subscribed to as a participant in normal text 210 and the roster may show a roster that a user is subscribed to as an observer in italicized text 212.

Figure 3:
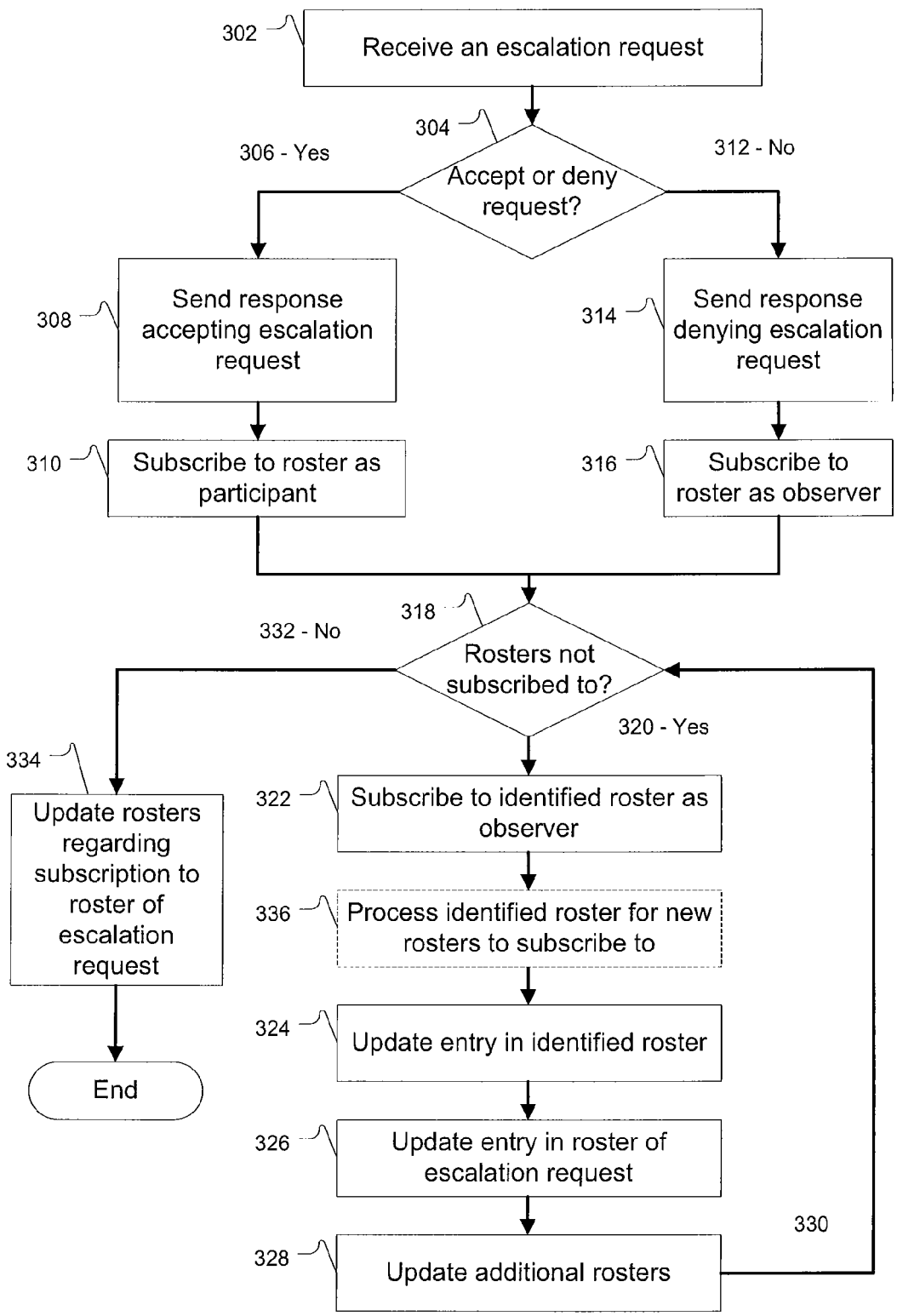
FIG. 3 illustrates one embodiment of a flowchart for unifying rosters associated with a communication event.

FIG. 3 is a flow chart of a method for unifying a roster. The method 300 begins at step 302 with a communication device (also known as a client) receiving an escalation request. In some implementations the communication device receives the escalation request from a server providing a communication service, where in other implementations the communication device receives the escalation request from a communication device associated with an escalator who generates the escalation request. The escalation request is associated with a roster. The escalation request may additionally be associated with a unique identifier and include one or more rosters that an escalator who generated the escalation request is subscribed to.

At step 304, the communication device determines whether to accept or deny the escalation request. If the communication device accepts the escalation request (branch 306), the client sends a response to the escalation request accepting the escalation request at step 308 and the client subscribes to the roster associated with the escalation request as a participant at step 310. However, if the communication device denies the escalation request (branch 312), the client sends a response to the escalation request denying the escalation request at step 314 and the client subscribes to the roster associated with the escalation request as an observer at step 316. In some implementations, the communication device sends the escalation request to a service device.

At step 318, the communication device determines whether the roster associated with the escalation request includes a roster that the communication device is not subscribed to. If the communication device identifies a roster that the communication device is not subscribed to (branch 320), the communication device subscribes to the identified roster as an observer at step 322. At step 324, the communication device updates an entry associated with the communication device in the identified roster to indicate that the communication device is subscribed to the roster associated with the escalation request as one of a participant or an observer. At step 326, the communication device updates an entry associated with the communication device in the roster associated with the escalation request to indicate that the client is subscribed to the identified roster an as observer.

At step 328, the communication device updates an entry associated with the communication device in any other rosters that the communication device is subscribed to that have not previously been updated to indicate that the communication device is subscribed to the identified roster as an observer. The process loops (330) to step 318 and repeats steps 322, 324, 326, and 328 until at step 318, the communication device determines that the roster associated with the escalation request does not include a roster that the communication device is not subscribed to (branch 332).

At step 334, the communication device updates an entry associated with the communication device in each roster that the communication device is subscribed to, other than the roster associated with the escalation request, that has not previously been updated to indicate that the communication device is subscribed to the roster associated with the escalation request as one of a participant or an observer.

It will be appreciated that while the above-described method has been described with the communication device searching through the roster associated with the escalation request for additional rosters to subscribe to, the communication device may perform steps similar to steps 318, 322, 324, 326, and 328 (shown as dotted box 336) each time the communication device subscribes to a roster so that as the communication device cascades though the rosters, the communication device subscribes to all rosters associated with a communication event. For example, if a communication device subscribes as an observer to a second roster that is identified in a first roster associated with an escalation request, the communication may search the second roster and identify a third roster that the communication device is not subscribed to. The communication device will then subscribe as an observer to the third roster and search the third roster for additional rosters that the communication device is not subscribed to, and so on.

FIGS. 1-3 illustrate systems and methods for unifying a communication system. As discussed above, a communication system allows a client to subscribe as a participant to a roster associated with a media type when the client desires to actively participate in that media type and allows a client to subscribe as an observer to a roster associated with a media type when the client does not desire to actively participate in that media type. When a client subscribes to a roster, the client searches the roster for any roster that the client is not currently subscribed to. If a roster is identified that the client is not currently subscribed to, the client subscribes to that roster as an observer and updates an entry associated with the client in the identified roster to indicate all other rosters that the client is subscribed to and whether the client is subscribed to each roster as a participant or an observer. Additionally, the client updates an entry in all other rosters that the client is subscribed to indicate that the client is now subscribed to the identified roster an observer. Due to this process, a client will have access to all rosters relating to a communication event so that the client may determine all the users participating in the communication event and all the media types that are available related to the communication event.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for unifying rosters, the method comprising:
receiving an escalation request at a first client device, the escalation request associated with a first roster, the first roster corresponds to a first media type associated with a communication event;
transmitting, from the first client device, a response to the escalation request, the response to the escalation request comprising one of an acceptance of the escalation request or a denial of the escalation request;
subscribing, at the first client device, the first client device as a participant to the first roster in response to the acceptance of the escalation request;
subscribing, at the first client device, the first client device as an observer to the first roster in response to the denial of the escalation request;
identifying, at the first client device, a second roster that the first client device is not subscribed to, wherein the second roster corresponds to a second media type associated with the communication event and wherein the second roster is subscribed to by a second client device that is also subscribed to the first roster; and
subscribing, at the first client device, the first client device to the second roster as an observer.

2. The method of claim 1, wherein the escalation request is a request to add a new media type to the first roster.

3. The method of claim 1, wherein the escalation request is a request to add a new person to the first roster.

4. The method of claim 1, further comprising:
Updating, at the first client device, an entry associated with the first client device in the second roster to indicate that the first client device is subscribed to the first roster as one of a participant or an observer; and
Updating, at the first client device, an entry associated with the first client device in the first roster to indicate that the first client device is subscribed to the second roster as an observer.

5. The method of claim 4, further comprising:
identifying, at the first client device, a third roster within the second roster that the first client device is not subscribed to;
subscribing, at the first client device, the first client device to the third roster as an observer; and
updating, at the first client device, the entry associated with the first client device in the first roster and the entry associated with the first client device in the second roster to indicate that the first client device is subscribed to the third roster as an observer.

6. The method of claim 4, further comprising:
determining, at the first client device, that the first client device is subscribed to a third roster; and
updating, at the first client device, an entry associated with the first client device in the third roster to indicate that the first client device is subscribed to the second roster as an observer and to indicate that the first client device is subscribed to the first roster as one of a participant or an observer.

7. The method of claim 4, further comprising:
for each additional roster, other than the second roster, within the first roster:
determining, at the first client device, that the first client device is not subscribed to the additional roster;
subscribing, at the first client device, the first client device to the additional roster;
updating, at the first client device, an entry associated with the first client device in the additional roster to indicate each roster that the first client device is subscribed to either as a participant or an observer; and
updating, at the first client device, an entry associated with the first client device in each roster that the first client device is subscribed to other than the additional roster to indicate that the first client device is subscribed to the additional roster as an observer.

8. A method for unifying rosters, the method comprising:
receiving an escalation request at a client, the escalation request associated with a first roster, and wherein the escalation request comprises one or more rosters that an escalator associated with the escalation request is subscribed to;
transmitting a response to the escalation request, from the client to the escalator, the response to the escalation request comprising one of an acceptance of the escalation request or a denial of the escalation request;
subscribing, at the client, the client to the first roster as a participant, in response to the acceptance of the escalation request;
subscribing, at the client, the client to the first roster as an observer, in response to the denial of the escalation request;
identifying, at the client, a second roster within the one or more rosters in the escalation request, wherein, the client is not subscribed to the second roster; and
subscribing, at the client, the client to the second roster as an observer.

9. A method of claim for unifying rosters, the method comprising:
receiving an escalation request at a client, the escalation request associated with a first roster;
transmitting a response to the escalation request, from the client to the escalator, the response to the escalation request comprising one of an acceptance of the escalation request or a denial of the escalation request and one or more rosters that the client is subscribed to;
subscribing, at the client, the client to the first roster as a participant, in response to the acceptance of the escalation request;
subscribing, at the client, the client to the first roster as an observer, in response to the denial of the escalation request;
identifying, at the client, a second roster within the first roster that the client is not subscribed to; and
subscribing, at the client, the client to the second roster as an observer.

10. The method of claim 2, wherein the escalation request comprises a request to add at least one of voice, video, instant messaging, or presentation share.

11. A non-transitory computer-readable media comprising instructions executable by a processor, the computer readable media comprising:
instructions to receive an escalation request at a first client, the escalation request associated with a first roster, and wherein the first roster corresponds to a first media type associated with a communication event;
instructions to respond to the escalation request, the response to the escalation request comprising one of an acceptance of the escalation request or a denial of the escalation request;
instructions to subscribe to the first roster as a participant, in response to the acceptance of the escalation request
instructions to subscribe to the first roster as an observer, in response to the denial of the escalation request
instructions to identify a second roster that the first client is not subscribed to, wherein the second roster corresponds to a second media type associated with the communication event and wherein the second roster is subscribed to by a second client in the first roster; and
subscribe to the second roster as an observer.

12. The non transitory computer-readable media of claim 11, further comprising instructions to:
update an entry associated with the first client in the second roster to indicate that the first client is subscribed to the first roster as one of a participant or an observer; and
update an entry associated with the first client in the first roster to indicate that the first client is subscribed to the second roster as an observer.

13. The non-transitory computer-readable media of claim 12, further comprising instructions to:
identify a third roster within the second roster that the first client is not subscribed to;
subscribe to the third roster as an observer; and
update the entry associated with the first client in the first roster and the entry associated with the first client in the second roster to indicate that the first client is subscribed to the third roster as an observer.

14. The non-transitory computer-readable media of claim 12, further comprising instructions to:
determine that the first client is subscribed to a third roster; and
update an entry associated with the first client in the third roster to indicate that the first client is subscribed to the second roster as an observer and to indicate that the first client is subscribed to the first roster as one of a participant or an observer.

15. The non-transitory computer-readable media of claim 12, wherein the escalation request comprises one or more rosters that an escalator associated with the escalation request is subscribed to; and
wherein the response to the escalation request comprises one or more rosters that the first client is subscribed to.

16. An apparatus comprising:
a memory including a set of instructions; and
a processor in communication with the memory, the processor configured to execute the set of instructions stored in the memory, wherein the set of instructions directs the processor to:
receive an escalation request at a first client, the escalation request associated with a first roster, and the first roster associated with a first media type used in a communication event;
respond to the escalation request, the response to the escalation request comprising one of an acceptance of the escalation request or a denial of the escalation request;
in response to the acceptance of the escalation request:
subscribe to the first roster as a participant;
in response to the denial of the escalation request:
subscribe to the first roster as an observer;
identify a second roster that the first client is not subscribed to, wherein the second roster is associated with a second media type used in the communication event, and wherein the second roster is subscribed to by a second client that is also subscribed to the first roster; and
subscribe to the second roster as an observer.

17. The apparatus of claim 16, wherein the set of instructions further directs the processor to
update an entry associated with the first client in the second roster to indicate that the first client is subscribed to the first roster as one of a participant or an observer; and
update an entry associated with the first client in the first roster to indicate that the first client is subscribed to the second roster as an observer;
identify a third roster within the second roster that the first client is not subscribed to;
subscribe to the third roster as an observer; and
update the entry associated with the first client in the first roster and the entry associated with the first client in the second roster to indicate that the first client is subscribed to the third roster as an observer.

18. The apparatus of claim 16, wherein the set of instructions further directs the processor to:
update an entry associated with the first client in the second roster to indicate that the first client is subscribed to the first roster as one of a participant or an observer; and
update an entry associated with the first client in the first roster to indicate that the first client is subscribed to the second roster as an observer;
determine that the first client is subscribed to a third roster; and
update an entry associated with the first client in the third roster to indicate that the first client is subscribed to the second roster as an observer and to indicate that the first client is subscribed to the first roster as one of a participant or an observer.

19. The apparatus of claim 16, wherein the second roster is on a list of rosters included within the first roster, the list of rosters comprising each roster subscribed to by each client of the first roster.

20. The method of claim 8, wherein the response to the escalation request comprises one or more rosters that the client is subscribed to.

21. The method of claim 8, further comprising:
updating, at the client, an entry associated with the client in the second roster to indicate that the client is subscribed to the first roster as one of a participant or an observer; and
updating, at the client, an entry associated with the client in the first roster to indicate that the client is subscribed to the second roster as an observer.

22. The method of claim 9, further comprising:
updating, at the client, an entry associated with the client in the second roster to indicate that the client is subscribed to the first roster as one of a participant or an observer; and
updating, at the client, an entry associated with the client in the first roster to indicate that the client is subscribed to the second roster as an observer.

* * * * *